L. A. CLARK.
MILKING DEVICE AND ANTIKICKER.
APPLICATION FILED FEB. 21, 1917.
1,244,175.                                              Patented Oct. 23, 1917.
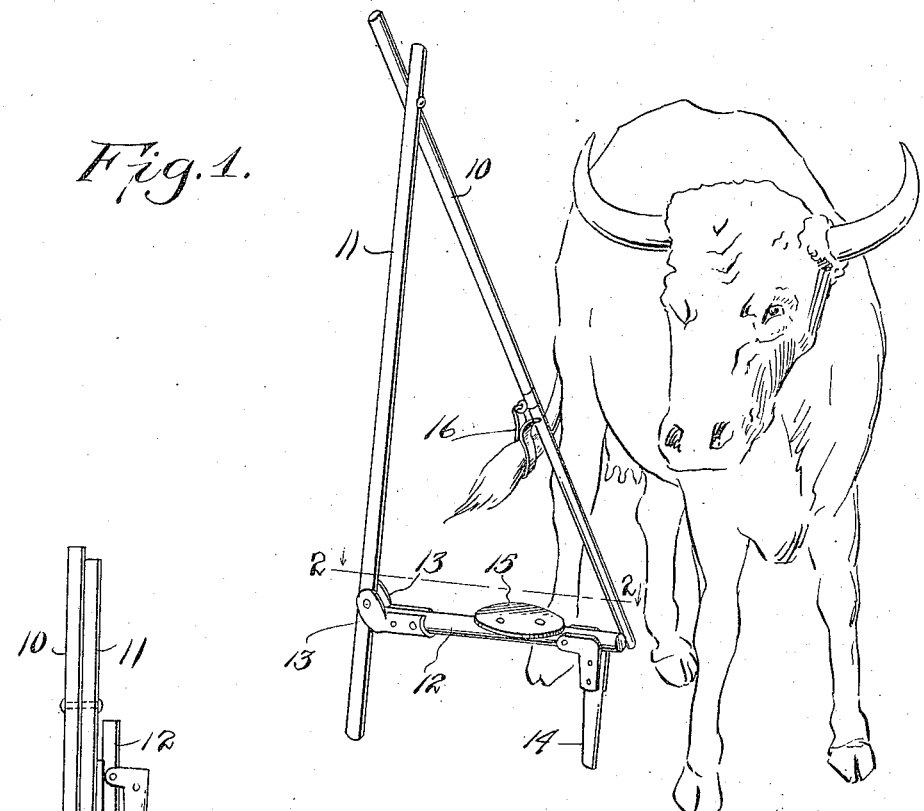
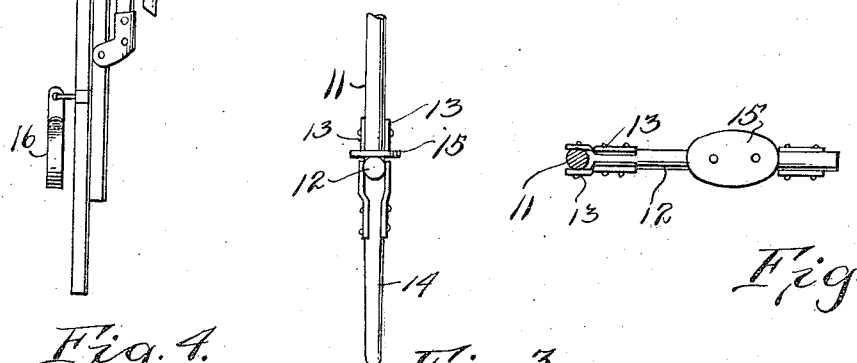
Inventor
L. A. Clark
Attorneys

UNITED STATES PATENT OFFICE.

LAURA A. CLARK, OF LONGVIEW, TEXAS.

MILKING DEVICE AND ANTIKICKER.

1,244,175.  Specification of Letters Patent.  Patented Oct. 23, 1917.

Application filed February 21, 1917. Serial No. 150,228.

*To all whom it may concern:*

Be it known that I, LAURA A. CLARK, a citizen of the United States, residing at Longview, in the county of Gregg, State of Texas, have invented certain new and useful Improvements in Milking Devices and Antikickers; and I do hereby declare the following to be a full, clear, and exact description of the invention, such as will enable others skilled in the art to which it appertains to make and use the same.

This invention relates to improvements in milking devices and antikickers.

One object of the invention is to provide a novel and simple device by means of which the milker can be assured that the cow will not kick over the bucket or upset him.

Another object is to provide a device of this character whereby the cow will be effectively prevented from switching the tail in the face of the milker.

A further object is to provide a device of this character wherein the milker's stool forms a part thereof, and by means of which the weight of the milker will hold the device in proper position.

Other objects and advantages will be apparent from the following description when taken in connection with the accompanying drawing.

In the drawing:

Figure 1 is a perspective view of my invention in position with respect to the cow.

Fig. 2 is a horizontal sectional view taken on the line 2—2 of Fig. 1.

Fig. 3 is an end view of the stool.

Fig. 4 is a view of the device in folded position.

Referring particularly to the accompanying drawing 10 represents a leg member which is arranged to be disposed between the cow's hind legs and in front of the right hind leg. Adjustably and pivotally connected to the upper end of the leg member 10 is a second shorter leg member 11, the lower end of which is arranged to rest on the floor at the side of the cow, and adjacent the milker. An arm 12 is provided with a pair of spaced ears 13 which are arranged in straddling relation to the lower portion of the leg member 11 and pivotally connected thereto for vertical folding movement with relation to the said leg member. Pivotally connected to the outer end of the said arm 12 is a depending foldable supporting leg 14. Secured to the upper side of the arm 12 is a seat member 15, on which the milker sits while milking the cow.

Carried by the leg member 10, at a point adjacent to that at which said leg member engages with the front of the cow's leg, is a clip 16 which is arranged to engage with the tuft or hairy end of the tail of the cow to hold the tail from being switched into the face of the milker.

Fig. 1 shows the position of the device when in operation. It will be noted that the leg member 10 is in front of the cow's right hind leg, and that the weight of the milker, on the stool, firmly holds the device in proper position. Also, it will be noted that, should the cow attempt to kick forwardly the leg would come in contact with the leg member 10, thereby effectively protecting the milker from injury, and also preventing the upsetting of the milk bucket. Thus the milker is permitted to milk the cow without danger of being kicked and the bucket upset, as well as being protected from the annoyance of the switching of the cow's tail.

When not in use, the leg members are moved on their pivots into close relation, the arm 12 being folded up against the member 11, and the leg 14 folded against the arm 12. Thus the device can be placed in a corner and occupy a very small space.

What is claimed is:

In a device of the character described, a pair of inclined leg members one of which is arranged to be disposed between the hind legs of a cow and in front of the right hind leg, the other leg member being pivotally connected to the upper end of the first leg member, an arm pivotally connected to the second leg member adjacent the lower end thereof, a seat member carried by said arm, and a folding supporting leg carried by the outer end of said arm.

In testimony whereof, I affix my signature, in the presence of two witnesses.

LAURA A. CLARK.

Witnesses:
 D. W. CLARK,
 J. N. CAMPBELL.

Copies of this patent may be obtained for five cents each, by addressing the "Commissioner of Patents, Washington, D. C."